ated Apr. 11, 1961

2,979,410
FOOD PACKAGE AND PACKAGING FILM THEREFOR

A. Kenneth Parlour, Chicago, Ill., assignor to Tee-Pak, Inc., Chicago, Ill., a corporation of Illinois No Drawing. Filed May 13, 1957, Ser. No. 658,538

7 Claims. (Cl. 99—171)

This invention relates to new composite food casings and more particularly to packaging films having special utility in the packaging of poultry, meats, fruits, vegetables, fish, cheeses and the like which are subject to deterioration due to bacterial action, mold development and similar decompositional influences.

During recent years great strides have been made in the packaging art as developed for the particular purpose of packaging poultry, meats and meat products. Efforts in this field have been directed to developing equipment and techniques of producing a tight, tear resistant transparent wrapping. Cellophane as the first of the synthetic packaging material was the precursor of many types of synthetic film forming materials. Although continuing to have very extensive contemporary use cellophane has more recently shared the market with moisture impermeable rubber hydrochloride. Additionally, the thermoplastic properties of polyvinylidene chloride and related copolymers have made these materials very desirable as transparent wrappers.

Although it had become possible by using these materials to more attractively package poultry, meats, cheeses and related products therein, the problem of producing and maintaining a pleasing and proper surface on the encased product itself has become a more significant aspect of packaging. With the product being fully exposed to visual examination through the wrapper it has become very necessary to extend the storage life of the wrapped foods by retarding or inhibiting the deterioration due to mold, bacterial action and associated decomposition, discoloration, and the other well-known accompanying evidences of undesirable changes in the product being packaged. For example, development of mold on meat products is particularly aggravating in many situations because its presence frequently makes the meat package unmarketable when the meat itself is yet edible. Similarly surface mold in many types of cheese is undesirable for esthetic reasons though not fundamentally destructive of the cheese.

Insofar as poultry is concerned, while the treatment of eviscerated fowl by contact with solutions of antibiotics such as aureomycin, terramycin and the like has improved storage life of poultry carcasses the problem has by no means been completely solved. For example, in the case of poultry which is cut up into chunks for "tray packing" much of the beneficial effect of such antibiotic pretreatment is lost due to recontamination of the component chunks of the bird stemming from contact with the workers' hands, tools, tables and air.

Accordingly, it is a principal object of this invention to provide improved means and methods for inhibiting the deterioration of meats, meat products, cheese, poultry and similar food products.

It is a further object of this invention to provide a composite food package that will be especially resistant to color loss of meat enclosed in the package and to development of mold inside the package.

A still further object is to provide a coated film, the nature of the inner coating or lamina providing grease-proofing properties while simultaneously providing mold resistant and bacterial resistant properties to the perishable food wrapped, covered or encased therein.

A further object is to provide improved packaged poultry in the form of dismembered or disjoined sections of a carcass which are packaged together after such dismemberment or disjuncture.

In proceeding to achieve these objects I have found that plastic films can be given wider commercial application by applying to the film a coating, continuous or discontinuous, of water-sensitive material and an antibiotic, antioxidant, antimycotic or fungicide, or combinations of these materials to the films, as hereinafter described in detail, thereby increasing the grease-proof property of the film while simultaneously providing a highly effective protection against mold development and other deleterious effects on encased food-stuffs.

The water-sensitive material constituting one of the essential components of the coating is so described to indicate the property of controlled solubility in water— or hydrophilic sensitivity—so that it becomes "moistened" on contact with water. An example of one type of material that is suitable is cellulose gum which can be mixed with other gums and plasticizers. Similarly, for the purposes of this invention, the term water-sensitive is definitive of water-swellable materials, such as polyvinyl alcohol which, even though it may be rendered rather insoluble, nevertheless, remains swellable by water. Other film coating materials of the same nature can be used such as carboxymethyl cellulose, polyvinylmethylether, algins and alginates. Still other such materials are hydroxyethylcellulose, hydroxyethylcarboxymethylcellulose, gum guar, gum arabic, gelatin, agar, gum acacia, gum karaya, gum tragacanth and the like.

From the foregoing, it can be seen that the water-sensitive material should be at normal temperature, soluble in water or water-swellable. Gelatins, glues and gums in general are broadly descriptive of the kind of materials found to be satisfactory.

Packaging films to which such materials can be suitably applied include, besides regenerated cellulose and what is known in the meat packaging art as fibrous casings, i.e., bags or tubes fabricated from sheets composed of cellulosic fibers and regenerated cellulose, the latter being formed in contact with the cellulosic fibers; such films as saran, rubber hydrochloride films ("Pliofilm"), vinyl film (a vinyl chloride acetate copolymer), polystyrene, cellulose acetate, "Mylar" (polyethyleneterephthalate produced by du Pont) and "Genetron" (produced by the General Chemical Division of Allied Chemical and Dye Corporation), trifluoroethylene films, films such as the one known commercially as "Visten," made of blends of polyvinyl chloride or vinyl-chloride-acetate co-polymer with nitrile or Buna-N rubber, as well as laminates of the above films with each other or with other films. The foregoing is not meant to be exhaustive or exclusive but is deemed to be properly descriptive of the range of application of the concepts of the invention.

Inasmuch as composite casings consisting of more than a single layer of one type of film casing material or consisting of layers of more than one type of film have special application in packaging, it is contemplated that the particular water-sensitive coating material used have equal application to such composite films. Accordingly, the complete film of this invention can be described as a multiple layer product one surface layer of which will have on it the water-sensitive material having incorporated therein various antibiotics, fungicides, antioxidants and the like, with the rest of the film composed of a layer or plurality of layers of plastic film constituents.

Of the various film materials contemplated for use as the second or subsequent lamina in this invention, such as those plastic materials mentioned above, test operations with regenerated cellulose casings are representative of the techniques applicable to producing a mold-inhibiting packaging material, as described in Example I below:

EXAMPLE I

A solution of 10 grams of ascorbic acid in water was added to 37.5 grams of a 4% solution of 400 centipoise methyl cellulose in water and the total diluted with water to a weight of 100 grams for the whole solution. The pH of the clear water white solution was 2.0; no change in color or clarity of the solution occurred during the 5 days of observation.

A second solution of 37.5 grams of a 4% solution of 400 centipoise methyl cellulose was diluted to a total weight of 100 grams with water.

These solutions were applied to the inside of formed regenerated cellulose casings and allowed to dry. Two small smoked picnic hams were obtained and one of these stuffed into each of the treated casings. The two hams were stored in a refrigerated display cabinet and first examined at the end of a forty-four day period at which time there were no apparent differences in the two hams. They were then again arbitrarily inspected after eighty-six days in the cabinet and at this time there was a considerable amount of white and dark mold on the surface of the meat under the control casing coated only with methyl cellulose. On the other hand, the ham in the casing conditioned with ascorbic acid in methyl cellulose exhibited only a trace of white mold and a slight amount of dark mold. The markedly reduced development of both white and dark mold in the casing carrying the ascorbic acid solution can be readily seen to be a great improvement over conventional untreated casing materials. Some variations in handling ascorbic acid and sorbic acid within the scope of this invention can be readily comprehended. Fundamental in any handling techniques, however, will be the fact that the acids are quite soluble in water and in solution are subject to air oxidation. I have found in this regard that stability can be enhanced by neutralizing the solution to a pH of about 6 to 7 with calcium hydroxide or sodium carbonate and the like.

The problem of dispersing the selected additive on the inner surface of the packaging material is likewise susceptible to solution in various ways. In applying ascorbic acid to the inside of an extruded regenerated cellulose casing I applied the aqueous solution containing 10% ascorbic acid and 1.5% methyl cellulose by opening the casing and filling a section with the solution. The liquid was then moved ahead of a squeeze roll and the casing dried thereafter. In working with either regenerated cellulose or with the synthetic casings named previously, it is desirable to deposit the ascorbic acid on the casing in a form which possesses good stability with no undue diminution in its mold-inhibiting activity. In this connection I have found that the ammonium salts of sorbic and ascorbic acid are, in some instances, even more effective than the acids themselves. I have also found that the use of ascorbic acid crystals or sorbic acid crystals which themselves have been coated with a water-sensitive material such as those hereinbefore described, are effective in controlling the migration of the ascorbic or sorbic acid to the outer portions of the water-sensitive film and into contact with the meat juices with which the film comes in contact when it is used for packaging. It can be considered that this provides a means for "metering out" the sorbic or ascorbic acid or other additive such as an antibiotic, or a fungicide, so that it is released more slowly than when it is dissolved in the solution of the material making up the water-sensitive film coating.

The preparation of packaging films in accordance with this invention can be achieved in a number of ways besides the specific way already described. Thus, the film web may be dipped in the coating composition, in which case both sides of the film are coated. Another way of applying the coating to the film is by spraying it onto a moving web of the film. Such treatment insures an adherent and a heavy coating when desired; however, control of volume delivery and the consequent control of the uniformity of application is somewhat difficult and frequently the appearance of the film, and particularly its transparency, is less satisfactory than when other application methods are used. Coated crystals of the additive may also be blown or dusted onto the film.

The coating composition may also be applied by means of a press such as a flexographic printing press; this method is quite satisfactory although it requires careful control of the print roll tolerance to assure uniformity of the coating.

The coating may be also applied during the film-orienting step in those cases wherein such oriented film as Pliofilm is used. The coating can also be done on a separate roll coating unit such as the Ecco Coater. A further method of coating involves using the well-known rotogravure technique for applying a uniform distribution of the coating onto the web of film being treated.

It is to be understood, of course, that in any of the coating methods used the coating must be dried without destroying the activity of the additive. Conventionally this can be easily accomplished by a high air velocity, relatively cool drying operation as those skilled in the art will readily appreciate. In some instances I have found that little more than room temperature (25–30° C.), with high velocity air, will give very satisfactory results.

Generally speaking the coating composition which is applied to the film in accordance with my invention, includes three components in an aqueous medium, these being, (a) a surface active agent, (b) a water-sensitive "adhesive" and (c) the additive (or additives as the case may be) such as an antibiotic, antimycotic, antioxidant and the like. The function of the surface-active agent is primarily to wet the hydrophobic surface of the film that is being coated. There are however, ancillary advantages stemming from its presence in the composition, including its effect in aiding the wetting of the product that is wrapped or encased in the film. Such wetting assists penetration and spreading of the additives over the surface of the product to be protected.

The water-sensitive "adhesive"—typified by the gums and the other materials hereinbefore described—is selected to best perform the following functions in a given case—that is, with a particular film, type of product being protected and the like:

(a) Adherence of the coating to the film;
(b) To function as a solvent or a carrier for the additive or additives;
(c) To control the release of the additive(s) upon contact with the wrapped product;
(d) To assist, stimulate and augment penetration of the additive(s) into the wrapped product;
(e) To assist in the migration of the additive(s) over the product to surfaces that are not in contact with the film;
(f) To protect the additive(s) from atmospheric degradation until the coated film is applied to a product;
(g) To maintain the additive(s) in a physical state of transparency comparable to the transparency of the parent film;
(h) To assist in uniform disposition of incorporated additives evenly over adjacent areas on the parent film by virtue of its own predetermined and selected viscosity and surface tension.

Among the additives which may be incorporated in the coating composition in accordance with the present invention, are the following:

Antibiotics such as aureomycin (chlortetracycline);

terramycin (oxytetracycline), penicillin, polymycin, and neomycin; antioxidants which may possess some antimycotic properties, such as ascorbic acid, sodium ascorbate, isoascorbic acid (d-araboascorbic acid), sodium isoascorbate; antimycotics such as sorbic acid, ammonium sorbate, sodium sorbate, n-butylsorbate, calcium propionate and similar propionates, derivatives of succinic acid such as dichloro-dimethylsuccinate, and the like.

It is to be understood, of course, that selection of the proper additive component of the coating composition to be applied to the wrapping or packaging film depends, at least to some extent, on the material which is to be packaged in the film. For example, where the additive is an antibiotic, such as aureomycin or terramycin the resulting film is particularly useful in extending the shelf-life of poultry; combined with other additives the film may have more specific utility with respect to extending keeping time and maintaining the appearance of hamburger and similar fresh meats.

Where a reducing agent such as ascorbic acid, sodium ascorbate, isoascorbic acid, sodium isoascorbate and products of the sulfhydryl type as cysteine and glutathione are used the resulting coated film when used in packaging cured meats induces color retention and development of such cured meats through its antioxidant or reducing action and by synergizing nitrite color development in the cured meats.

Where sorbic acid, ammonium sorbate, sodium sorbate, n-butylsorbate and similar products are the additives incorporated into the coating composition, the resulting packaging film has antimycotic applications and is particularly useful in dry sausage packaging; and, of course, combinations of additives may be used, to combine the beneficial effects of, for example, antibiotics and antimycotics such as aureomycin and sorbic acid.

For further illustration of my invention, reference is made to the following detailed examples.

Example II below illustrates an embodiment of my invention wherein the additive used as a component of the coating composition applied to the film is illustrated by ascorbic acid, isoascorbic acid, sodium ascorbate, sodium isoascorbate and other alkali metal and alkaline earth and ammonium salts thereof. In preparing these novel coated packaging films the desideratum was to provide a source of ascorbic acid—or one of the related compounds specifically listed above—to the surface of cured meat products so as to restore and/or improve and sustain the color. The ascorbic acid or one of the closely related compounds above listed—when coated on a film in accordance with my technique is controllably "released," the nature and speed of the "release" depending on the adhesive water-sensitive component used.

EXAMPLE II

Films were prepared by application to both saran and to oriented Pliofilm, an aqueous solution containing by weight:

10% sodium isoascorbate (d-araboascorbic acid, sodium salt)
0.7% sodium carboxymethylcellulose having a viscosity of 1250 cps. (1% solution)
0.05% guar gum having a viscosity of 3300 cps. (1% solution)
0.2% of Triton X-100 (polyethylene glycol mono-iso-octyl phenylether)

Wrapping Bologna sausage in these films resulted in improved color development on the cut end of the sausages.

EXAMPLE III

Samples of saran and oriented Pliofilm were coated with an aqueous solution containing by weight:

15% sodium isoascorbate
0.7% sodium carboxymethylcellulose having a viscosity of 1250 cps. (1% solution)
0.05% guar gum having a viscosity of 3300 cps. (1% solution)
0.02% surface active agent Triton CF-10 (alkyl aryl ether)

These films like the preceding were dried at temperatures of 25–30° C. after being coated.

Bologna sausage wrapped in these films were found to exhibit a delay in color development on the film-contacting surface of the sausages for one week, the sausages being stored at 40° F. under fluorescent lighting.

EXAMPLE IV

Saran and oriented Pliofilm were coated with an aqueous solution containing by weight:

30% sodium ascorbate
0.75% methyl cellulose (100 cps. 1% solution)
0.25% Triton X-100 (polyethylene glycol mono-iso-octyl phenylether)

The films were then dried, as in the examples above.

Bologna sausages wrapped in the thus treated films were found to show a delay in color development of the face-containing surfaces of the meats for several days when the packaged materials were held at 40° C.

By controlling the amount of gums or adhesive components of the coatings, as well as their viscosities, and by using wetting agents as above taught, the "release" of the additive can be controlled so as to produce color development, and migration of the additives, over a predetermined period of time as desired. Such controlled release may be obtained by using blends of various gums. For example, with ascorbic acid a slow rate of release is generally desired, while with antibiotics a high rate of release is usually wanted.

The following experiments wherein sodium carboxymethylcellulose and methyl cellulose were used as the water-sensitive "adhesive" illustrate the use of my invention when gums of low viscosity are used.

EXAMPLE V

Oriented Pliofilm films were coated with an aqueous solution containing by weight:

0.3% sorbic acid
0.3% sodium carboxymethylcellulose

Dry sausage packaged in such films were found to exhibit a delay in the development of molds exceedingly well. No mold developed where the film contacted the surface of the product, but some did develop in the creases at the end of the sausage stick where intimate contact was not obtained.

Similar experiments were performed wherein oriented Pliofilm was coated with an aqueous solution containing by weight:

15% ammonium sorbate
0.3% sodium carboxymethylcellulose
0.1% Triton X-100 (polyethylene glycol mono-iso-octyl phenylether) by weight The film being dried at room temperature thereafter was found to impart good antimycotic protection for dry sausage packaged therein.

A similarly effective film was produced by coating oriented Pliofilm with an aqueous solution containing by weight:

25% sodium sorbate
0.3% sodium carboxymethylcellulose (having a viscosity of 1250 cps.-1% solution)
0.15% Triton X-100 (polyethylene glycol mono-iso-octyl phenylether)

While a number of glues, gums, gelatins and similar materials may be used as above indicated, it is preferable that the viscosity of the material used be such that it ranges downwardly from about 3500 cps. at 25° C. (the viscosity being measured after 24 hours, colloid concentration 1% by weight). In this preferred group are sodium carboxymethylcellulose (high viscosity), Stabiloid HV Irish moss extract, gum tragacanth No. 1, methyl cellulose, locust bean gum and gum arabic No. 1.

The viscosities of the adhesive gums used in the practice of my invention are typified by the following, the viscosities being given in centipoises for a 1% solution: Guar gum 3300; "high viscosity" sodium carboxymethylcellulose, 1250; gum-tragacanth, 250; methyl cellulose 200; gum arabic, 100 (this being the viscosity of a 20% solution). I have had particularly good results using 0.3% aqueous solution of sodium carboxymethyl cellulose, although the solution concentration may, of course, be varied, as seen from the above figures from about 0.1% to preferably not above about 20%.

The concentration of additives, where the additive is aureomycin, terramycin, penicillin, polymycin or neomycin, which I have found to be especially useful is 500 to about 9000 micrograms per square foot of film area.

Where the additive is ascorbic acid or its derivative salts and related compounds I have found that treatment which imparts from 10,000 to 240,000 micrograms per square foot of film area is very desirable; where the additive is sorbic acid or its derivatives, then from about 1,000 to about 66,000 micrograms per square foot of film area are especially effective.

From about 0.05% to about 2 or 3% by weight of the "coating liquid" represents useable amounts of wetting agents; best results are ordinarily obtained when the wetting agent represents about 0.2 to 0.5% of the liquid coating.

In the case of wrapping films which are to be used for poultry it is desirable that they be coated with chlortetracycline or oxytetracycline, or one of the other antibiotics specified, so that a very short interval between proximity and release is obtained. A coated film of this type particularly where the "parent" film is a shrinkable one, such as oriented rubber hydrochloride, which is shrunk onto the bird by heating the film in which the bird is packaged as by a warm air blast, or contact with hot water, insures maximum contact of the film with the product encased therein, the "water-sensitive adhesive" functioning to "trigger" the release of the additive when the coating is moistened as by contact with meat and the like.

The laminated composite film of this invention is producible by several methods in addition to the above-described coating operation. In some situations and with certain of the named water-sensitive materials, the inner application, coating or lamina of water-sensitive materials can itself be a cast film onto which a second film, or plurality of films, is cast or otherwise secured. Similarly, the second or outer film in a bi-layer film, for example, can be fused to the first or retained by the use of an intermediate adhesive layer. In the case of cheese manufacture the inner lamina consisting of polyvinyl alcohol, for example, can be applied by dipping the cheese into a solution of the polyvinyl alcohol containing ascorbic or sorbic acids. When this film is dry the whole can be given a coating of any conventional insoluble film to produce the composite laminate.

In addition to ascorbic or sorbic acids, and the salts thereof, particularly the ammonium salts, antibiotics such as penicillin, aureomycin, terramycin, polymycin or neomycin, antimycotics such as calcium propionate, for example, may be incorporated in the inner lamina, or applied to the inner surface of the outer lamina for migration into and through the inner lamina. In such case, as with the application of mold-inhibiting acids, it is essential that the water-sensitive material be such as will permit these entrained acids and salts to migrate out of the film to the surface thereof under normal temperature conditions existing during packaging, handling and storage of meat and like foods.

The following examples will illustrate my invention with respect to the packaging of poultry and the like.

EXAMPLE VI 10 birds were used in this test. Five of the birds were wrapped in plain oriented Pliofilm and the other five were wrapped in oriented Pliofilm (both shunk onto the bird by heating the film) which had been coated, in accordance with the foregoing principles, with 500 milligrams of chlortetracycline per square foot. The birds were stored at 50° F. and examined after one, three and six days. There was no observable difference between the birds after one day, but after three days, storage the control bird smelled somewhat stronger than the bird wrapped in coated film.

After six days the difference between the birds was greatly evident. The film on the control bird was swollen because abundant gas formation and greenish-black sulfide discolorations were evident about the legs and wing tips. The control bird also had a definite putrid odor and the skin surface was covered with white slime. The bird wrapped in the coated film did not show gas formation; no sulfide discolorations were evident, the odor was only slightly objectionable, and less slime was present on the skin surface.

The following example further illustrates the use of my invention in the packaging of poultry.

EXAMPLE VII

Samples of skin and muscle were removed from the packages and assayed for antibiotic concentration. Definite evidence of migration and added penetration of antibiotic to and into the cut surfaces were shown through the increased assay over similar poultry samples wrapped in uncoated film, as seen in Tables I and II below.

*Table I*

TETRACYCLINE ASSAY DATA FROM SKIN SAMPLES TAKEN FROM CHICKEN STORED 12 DAYS

In order to determine the amount of migration of the tetracycline on the birds wrapped with the coated film, 5 gram portions of skin were removed from the back of the bird which was in direct contact with the coated side of the film and from the inner portion of the leg, which did not contact the film.

| Sample | Tetracycline Recovered (in p.p.m.) |
|---|---|
| 1. Back (Plain ice cooled intimate film contact) | 3.6 |
| 2. Leg (Plain ice cooled no film contact) | 0.6 |
| 3. Back (Tetracycline ice cooled intimate film contact) | 10.4 |
| 4. Leg (Tetracycline ice cooled no film contact) | 5.8 |

*Table II*

ANTIBIOTIC ASSAY DATA TETRACYCLINE CONCENTRATION (IN P.P.M.)

| Days of Storage | Plain Ice Cooled Plain Film | Plain Ice Cooled Coated Film | Tetracycline Ice Cooled Plain Film | Tetracycline Ice Cooled Coated Film |
|---|---|---|---|---|
| 0 | 0 | 0.8 | 0.9 | 1.3 |
| 3 | 0 | 3.5 | 2.5 | 8.5 |
| 6 | 0 | 2.5 | 4.7 | 10.1 |
| 9 | 0 | 0.22 | 2.1 | 4.0 |
| 12 | 0 | 1.3 | 2.7 | 3.0 |
| 15 | 0 | 2.8 | 2.3 | 4.7 |
| 18 | 0 | 1.0 | 2.5 | 4.1 |
| 21 | 0 | 1.7 | 5.9 | 11.5 |
| 24 | 0 | 1.6 | 4.6 | 5.1 |
| Averages | | 1.7 | 3.1 | 5.8 |

The birds used in Example VI had not been treated with antibiotic prior to wrapping. The birds wrapped in the plain film were the control.

The birds used in Example VII had all been chilled in ice water prior to being cut up and packaged. Those marked "Plain Ice Cooled" had been dipped in ice water that contained no antibiotic. Those marked "Tetracycline Ice Cooled" had been dipped in ice water that contained tetracycline. The film for packaging had, in all instances, been coated with tetracycline in accordance with the foregoing prinicples.

The use of coated shrinkable or "oriented" film as the base film to be treated with additives in accordance with the present invention, tremendously increases the utility of this invention. For example, we have found that it is highly important for best results that intimate contact be obtained between the film and the material being protected, if the coating is to afford any substantial benefit. Such contact is, of course, obtained to a much higher degree with heat-shrinkable films such as oriented Pliofilm, Mylar and the like, shrunk onto the material being protected, than with non-shrinkable or non-oriented types. The importance of intimate contact is illustrated by Example VII above, and by tests in which dry sausage was overwrapped with sorbic acid coated oriented Pliofilm, as in Example V.

This application is a continuation-in-part of my application Serial No. 450,780, filed August 18, 1954, now abandoned.

I claim:

1. A package comprising a food product normally susceptible to spoilage by fungus, molds, and bacteria, encased within a food packaging film, said film comprising an oriented, heat-shrinkable film and at least one lamina of water-sensitive material selected from the group consisting of gums, gelatins, glues and plastics, said material containing a fungicide, said film being shrunk onto said food product by the application of heat thereto for intimately contacting the surfaces thereof with the said film.

2. A package comprising a food product normally susceptible to spoilage by fungus, molds, and bacteria, encased within a food packaging film, said film comprising an oriented heat-shrinkable film and at least one lamina of water-sensitive material selected from the group consisting of gums, gelatins, glues and plastics, said material containing a mold-derived antibiotic, said film being shrunk onto said food product by the application of heat thereto for intimately contacting the surfaces thereof with the said film.

3. A package comprising a food product normally susceptible to spoilage by fungus, molds, and bacteria, encased within a food packaging film, said film comprising an oriented heat-shrinkable film and at least one lamina of water-sensitive material selected from the group consisting of gums, gelatins, glues and plastics, said material containing a reducing agent, said film being shrunk onto said food product by the application of heat thereto for intimately contacting the surfaces thereof with the said film.

4. A heat-shrinkable, food packaging film comprising a plurality of laminae at least one lamina consisting of an oriented, heat-shrinkable film, and at least one lamina consisting of a water-sensitive material selected from the group consisting of gums, gelatins, glues and plastics, and a fungicide uniformly distributed therethrough, said water-sensitive material permitting migration of said fungicide out of said material when the last said lamina is wetted in contact with a food product enclosed in said packaging film.

5. A heat-shrinkable, food packaging film comprising a plurality of laminae, at least one lamina consisting of an oriented, heat-shrinkable film, and at least one lamina consisting of a water-sensitive material selected from the group consisting of gums, gelatins, glues and plastics, having uniformly distributed therethrough a mold-derived antibiotic, said water-sensitive material permitting migration of said antibiotic out of said material when said lamina is wetted in contact with a food product enclosed in said packaging film.

6. A heat-shrinkable, food packaging film comprising a plurality of laminae, at least one lamina consisting of an oriented, heat-shrinkable film, and at least one lamina consisting of a water-sensitive material selected from the group consisting of gums, gelatins, glues and plastics, and a reducing agent uniformly distributed therethrough, said water-sensitive material permitting migration of said reducing agent out of said material when the last said lamina is wetted in contact with a food product enclosed in said packaging film.

7. A food packaging film comprising oriented, heat-shrinkable rubber-hydrochloride film and at least one lamina of water-sensitive material selected from the group consisting of gums, gelatins, glues and plastics, said material containing a mold-derived antibiotic uniformly distributed therethrough, said water-sensitive material permitting migration of said antibiotic out of said material when said lamina is wetted in contact with a food product enclosed in said packaging film.

References Cited in the file of this patent

UNITED STATES PATENTS

| 2,159,743 | Latham et al. | May 23, 1939 |
| 2,185,649 | Ruoff | Jan. 2, 1940 |
| 2,480,010 | Flett | Aug. 23, 1949 |
| 2,532,489 | Ferguson | Dec. 5, 1950 |
| 2,585,501 | Rusoff et al. | Feb. 12, 1952 |
| 2,906,646 | Smith et al. | Sept. 29, 1959 |

FOREIGN PATENTS

| 110,841 | Australia | June 18, 1940 |
| 822,758 | Great Britain | Oct. 28, 1959 |

OTHER REFERENCES

"Refrigerating Engineering," February 1954, page 46, article entitled Packaging and Wrapping Materials.

"Food Technology," March 1954, pages 133, 134 and 135.